United States Patent
Wu et al.

(10) Patent No.: US 6,539,600 B2
(45) Date of Patent: Apr. 1, 2003

(54) PRESSING MACHINE FOR JOINING WORKPIECES

(75) Inventors: Bo Ling Wu, Shenzhen (CN); Ya Qiang He, Shenzhen (CN); Lie Qiang Bu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 73 days.

(21) Appl. No.: 09/753,830

(22) Filed: Jan. 3, 2001

(65) Prior Publication Data

US 2002/0083850 A1 Jul. 4, 2002

(51) Int. Cl.[7] .................................................. B23P 19/04
(52) U.S. Cl. ............................. 29/252; 29/256; 29/283; 29/281.1; 269/234
(58) Field of Search .......................... 29/252–259, 559, 29/243.5, 432.1, 283, 267, 281.1; 269/23.4

(56) References Cited

U.S. PATENT DOCUMENTS

| | | | |
|---|---|---|---|
| 2,893,275 A | * | 7/1959 | Lindemann |
| 3,538,591 A | * | 11/1970 | Reynolds et al. ............. 29/252 |
| 3,880,604 A | * | 4/1975 | Hawkins ...................... 29/252 |
| 4,409,720 A | * | 10/1983 | Boudreau ................. 29/432.1 |

* cited by examiner

Primary Examiner—Lee Wilson
(74) Attorney, Agent, or Firm—Wei Te Chung

(57) ABSTRACT

A pressing machine for joining two workpieces includes a workbench (10), a rigging (30) providing periodical vertical movement, a pair of pressing devices (42) for impacting the workpieces, and a push apparatus (70). A wedge block (40) is secured under the rigging. The wedge block has two first slopes (48). The push apparatus includes a push block (70) with a second slope. A stop screw (26) is secured in the workbench. When the rigging is moved downwardly, the pressing devices impact the workpieces and the first slopes abut against the second slope. The push block is moved toward the workpieces, thereby pushing one workpiece to move relative to the other one. When the wedge block abuts the stop screw, the push block stops pushing the workpiece. The moving workpiece is completely engaged with hooks formed in the stationary workpiece at corresponding openings defined in the moving workpiece.

17 Claims, 6 Drawing Sheets

PRESSING MACHINE FOR JOINING WORKPIECES

BACKGROUND OF THE INVENTION

1. Field of the Invention

The present invention relates to a pressing machine for joining workpieces, and particularly to a pressing machine for joining a metal member and a plastic member of a computer enclosure.

2. Related Art

A conventional computer enclosure is made of metal. A surface of the computer enclosure is often plated or covered with lacquer. Various chemical substances are generally required for plating or lacquering. The processes of surface treatment usually produce waste material.

Thus more and more computer enclosures are being made whereby pre-formed metal members and plastic members are joined together. Typically, a metal member is firstly placed on a plastic member, with hooks formed on the plastic member extending through openings defined in the metal member. The metal member is then pressed downwardly and slid horizontally relative to the plastic member, so that the metal member engages with the hooks of the plastic member. The entire operation is done manually, which is toilsome and time-consuming. Furthermore, there is risk of injury to an operator's hands.

It is strongly desired to provide a pressing machine for joining two workpieces which overcomes the above problems encountered in the related art.

SUMMARY OF THE INVENTION

Accordingly, an object of the present invention is to provide a pressing machine which can easily join workpieces.

To achieve the above-mentioned object, a pressing machine for joining workpieces in accordance with the present invention comprises a workbench, a rigging providing periodic vertical movement, a pair of pressing devices for impacting workpieces and a push apparatus. The rigging comprises a cylinder, a connecting board, and a coupling bar connected between the cylinder and the connecting board. A wedge block is secured under of the connecting board. The wedge block has a pair of protrusions, each protrusion having a first slope. The push apparatus comprises a push block and a pair of guide devices secured on the workbench. The push block has a second slope. A stop screw is secured on the workbench. When the rigging is moved downwardly, the pressing blocks impact the workpieces and the first slopes of the wedge block abut against the second slope of the push block to cause the push block to move toward the workpieces. One workpiece is thereby pushed relative to the other one which is fixed on the workbench. When the wedge block abuts the stop screw, the push block stops pushing the workpiece. The moving workpiece is completely engaged with hooks formed in the stationary workpiece, at corresponding openings defined in the moving workpiece.

Other objects, advantages and novel features of the present invention will be drawn from the following detailed description of preferred embodiment of the present invention with reference to the attached drawings, in which:

DESCRIPTION OF THE PREFERRED EMBODIMENTS

Figure 1:
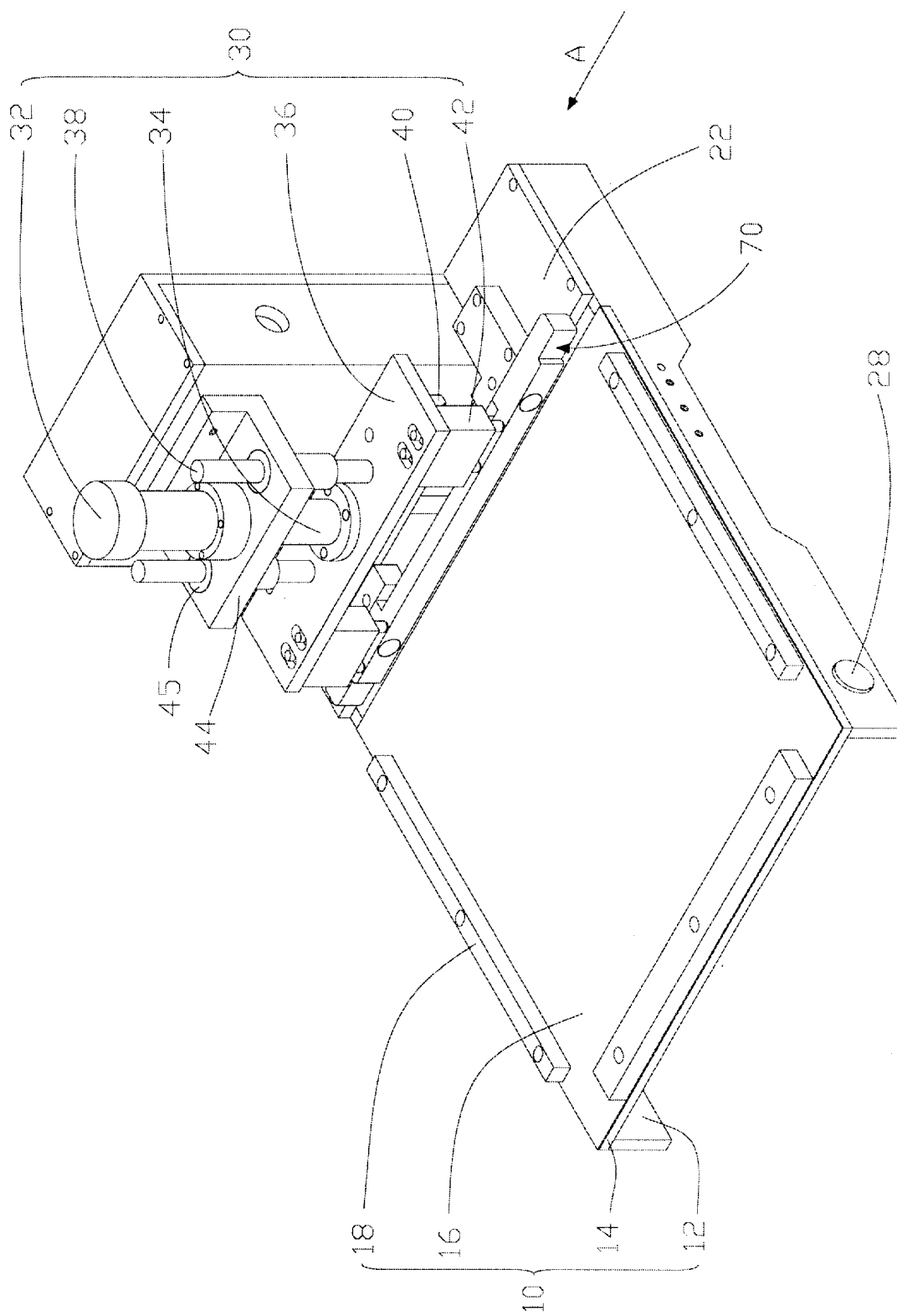
FIG. 1 is a perspective view of a pressing machine for joining workpieces in accordance with the present invention.

Referring to FIG. 1, a pressing machine in accordance with the present invention comprises a workbench 10, a rigging 30, and a push apparatus 70.

Figure 2:
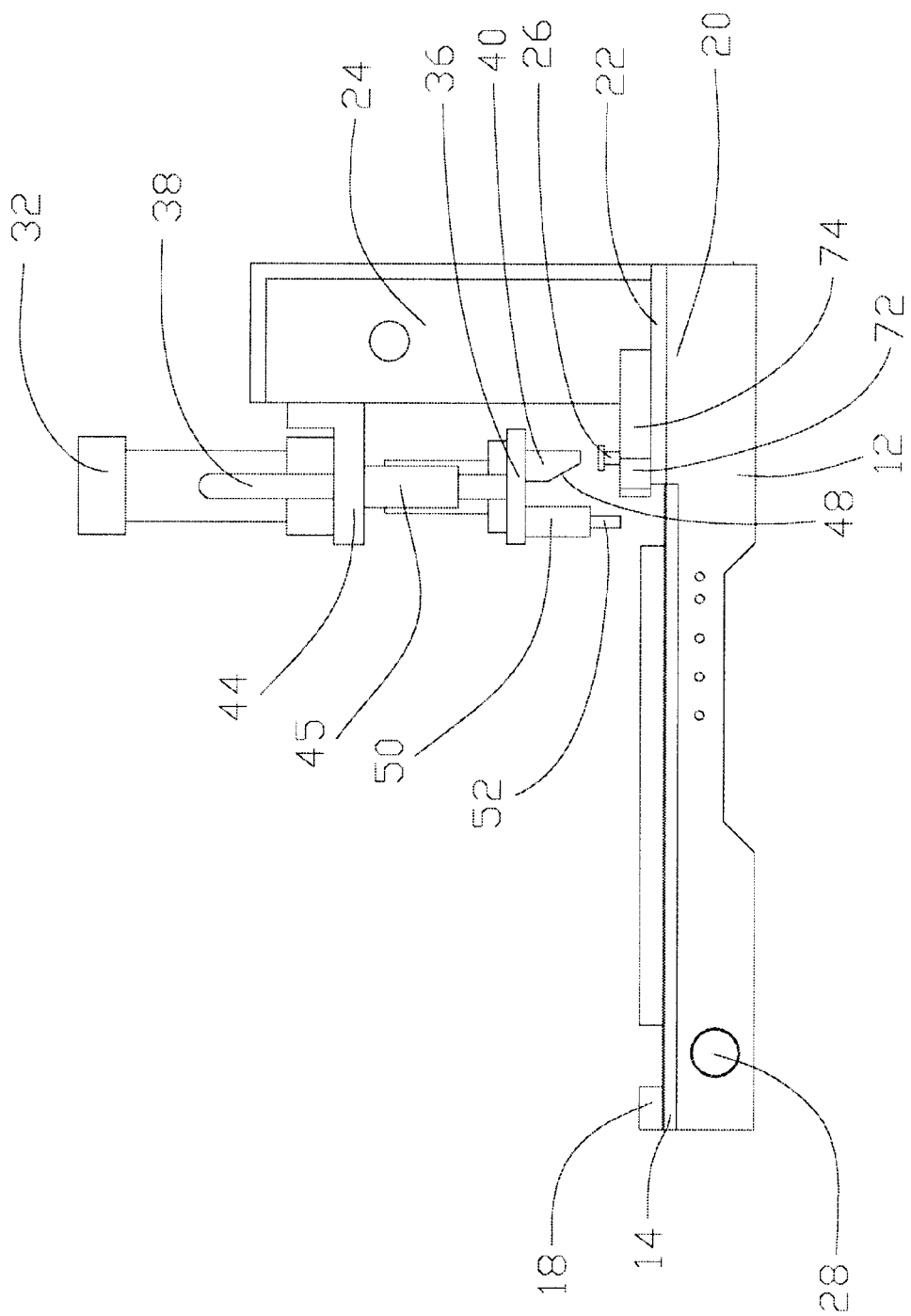
FIG. 2 is a side elevational view of FIG. 1, viewing the pressing machine in direction A.

Referring also to FIG. 2, the workbench 10 comprises a pair of side walls 12, a base 14, a thin rubber gasket 16 and three elongate stop blocks 18. The pair of side walls 12 each form a shoulder 20 in the same sides thereof. A rectangular plate 22 is placed over the shoulders 20 of the side walls 12. A chassis 24 is attached on a center portion of an external side of the plate 22. The base 14 is secured over the side walls 12, opposite to and level with the shoulders 20 of the side walls 12. A pair of stop blocks 18 is secured on opposite sides of the base 14, and another stop block 18 is secured on a front side of the base 14 opposite to the plate 22. The rubber gasket 16 is attached on the base 14, below the stop blocks 18. The stop blocks 18 are made of rubber. Each side wall 12 has a power supply button 28 near a front end thereof.

Figure 3:
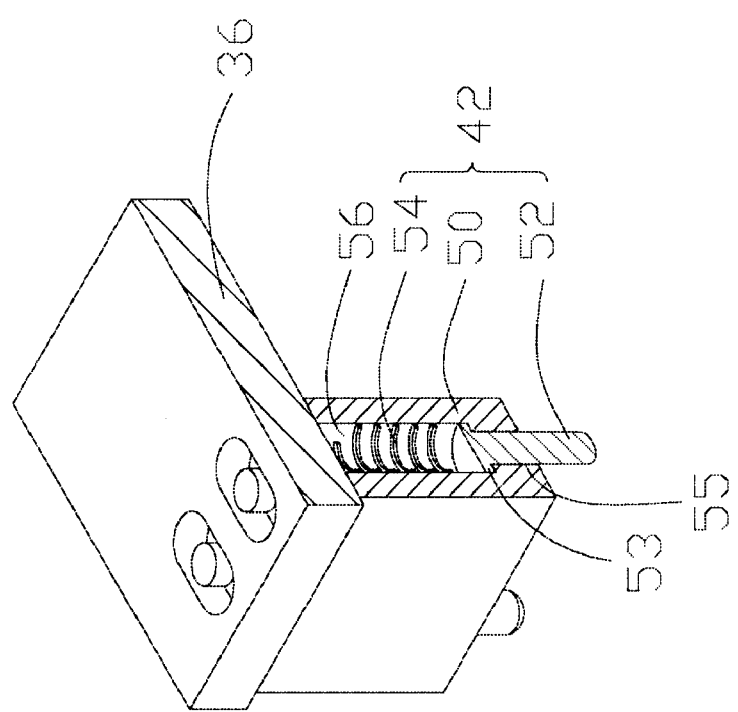
FIG. 3 is a cross-sectional view of a pressing device and a connecting board of FIG. 1.

Referring also to FIG. 3, the rigging 30 comprises a cylinder 32, a coupling bar 34, a connecting board 36, a pair of guide posts 38, a wedge block 40 and a pair of pressing devices 42. The cylinder 32 is attached on a central portion of a cylinder seat 44 which is secured on a side panel (not shown) of the chassis 24. A top end of the coupling bar 34 is movably received in the cylinder 32, and a bottom end of the coupling bar 34 is secured on the connecting board 36 by conventional means. A pair of guide bushings 45 is interferentially engaged with the cylinder seat 44, on opposite sides of the cylinder 32. A bottom end of each guide post 38 is secured in the connecting board 36, and a higher portion of each guide post 38 extends through the corresponding guide bushing 45. The wedge block 40 is secured under the connecting board 36, adjacent the chassis 24. A pair of protrusions 46 depends from opposite ends of the wedge block 40 (see FIG. 5). Each protrusion 46 forms a first slope 48 on a side thereof farthest away from the chassis 24.

The pressing devices 42 are secured under opposite sides of the connecting board 36, and opposite to the wedge block 40. Each pressing device 42 comprises a pressing block 50, a pair of pressing pins 52, and a pair of first springs 54. A pair of through apertures 55 is defined in the pressing block 50. A pair of piston holes 56 is defined in the pressing block 50, above and in communication with the corresponding through apertures 55. The pair of springs 54 is respectively received in the through apertures 56 of the pressing block 50. The pair of pressing pins 52 is respectively movably received in the through apertures 55 of the pressing block 50. Each pressing pin 52 has a cap 53 on a top thereof. The caps 53 are accommodated in bottom portions of the respective piston holes 56, and abut respective springs 54.

Figure 4:
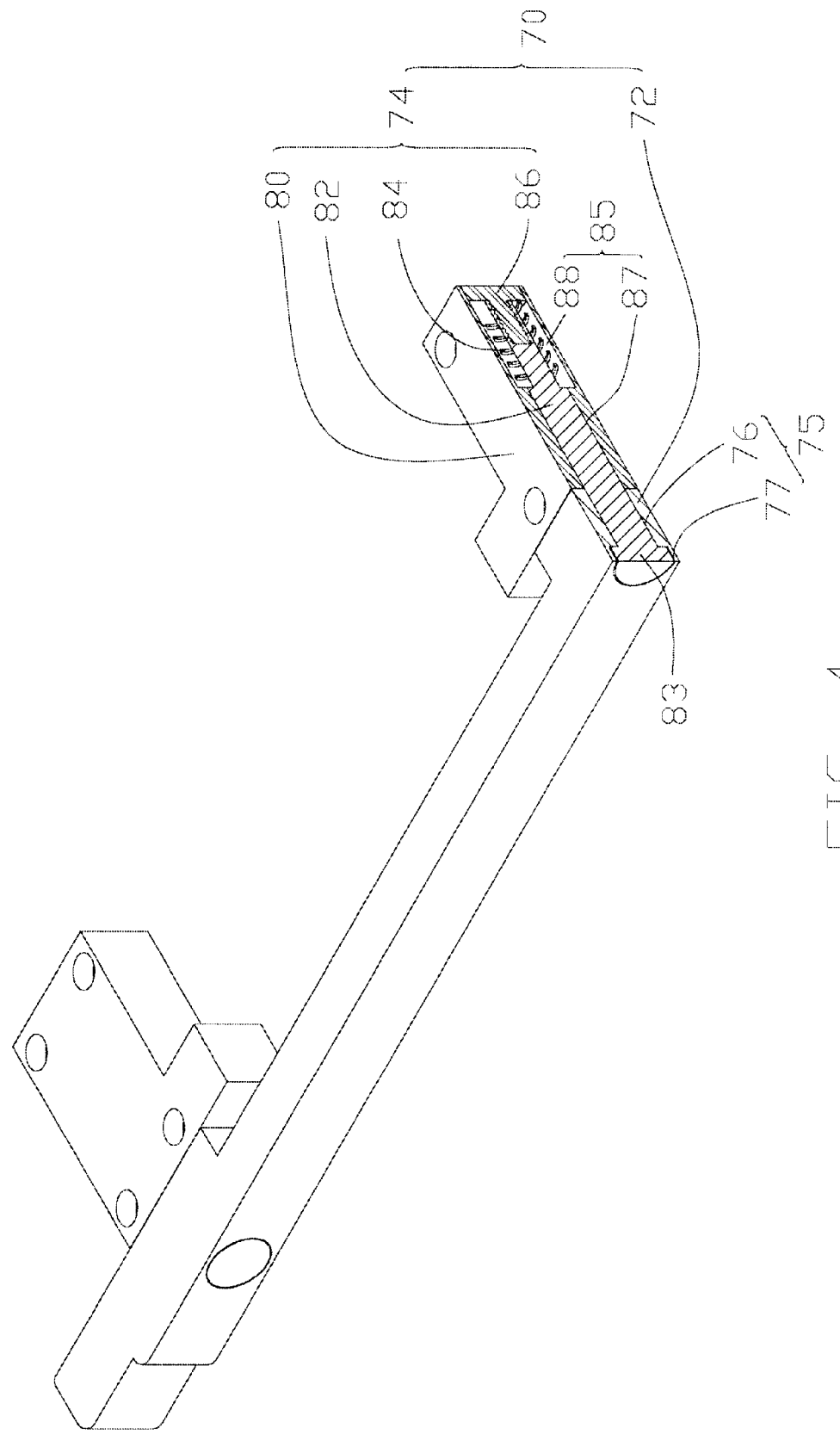
FIG. 4 is a cross-sectional view of a push apparatus of FIG. 1.
Figure 5:
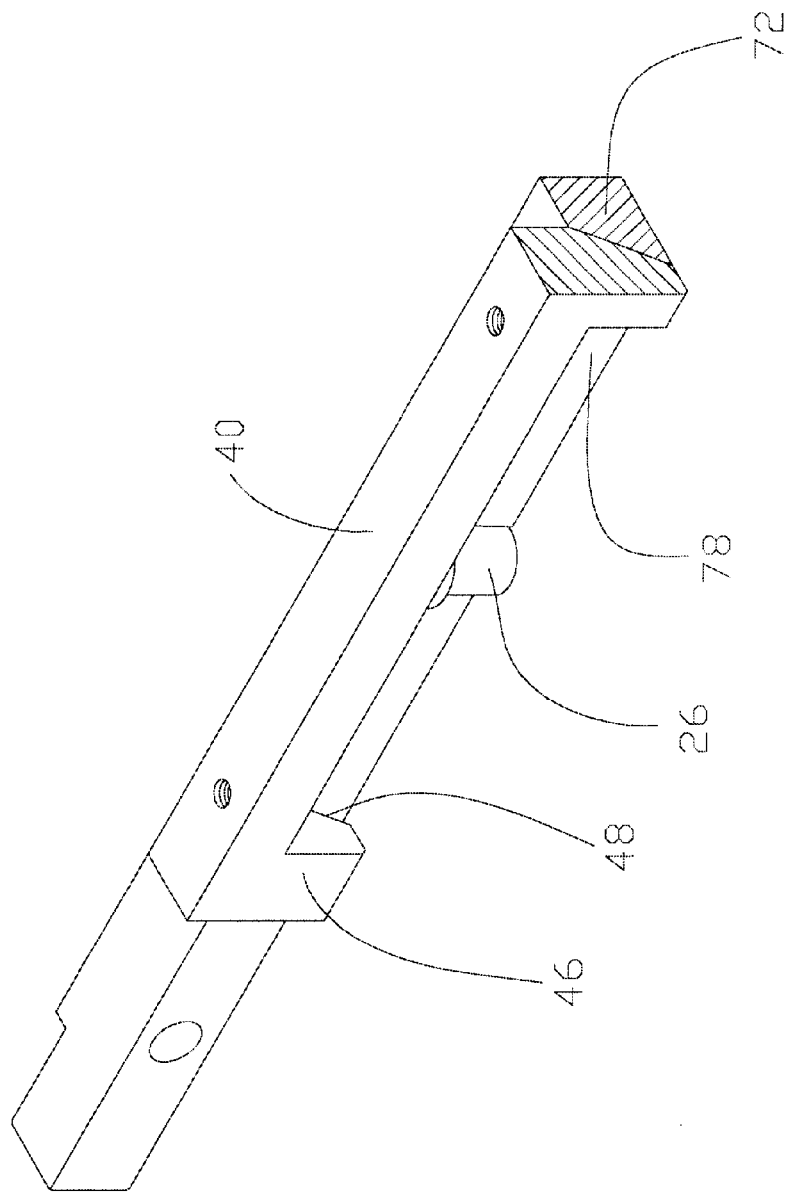
FIG. 5 is a cross-sectional view of an assembly of a wedge block and a push block of FIG. 1.

Referring also to FIGS. 4–5, the push apparatus 70 comprises a push block 72 and a pair of guide devices 74 secured on the plate 22 of the workbench 10. A pair of shoulder holes 75 is respectively defined in opposite sides of the push block 72. Each shoulder hole 75 comprises a smaller hole 76 adjacent the guide device 74, and a larger hole 77 in communication with the smaller hole 76. A second slope 78 is formed on a longitudinal side of the push block 72 adjacent and between the pair of guide devices 74, corresponding to the first slopes 48 of the wedge block 40 (see FIG. 5). A stop screw 26 is secured in the plate 22, with a half thereof extending through the second slope 78. A top extremity of the stop screw 26 is higher than a top extremity of the push block 72.

Referring particularly to FIG. 4, each guide device 74 comprises a guide block 80, a guide rod 82, a second spring 84 and a bolt 86. The guide block 80 is generally L-shaped and secured on the plate 22. A shoulder aperture 85 is defined through the guide block 80. Each shoulder aperture 85 comprises a smaller aperture 87, and a larger aperture 88 in communication with the smaller aperture 87. The smaller aperture 87 communicates with the smaller hole 76 of the push block 72. The guide rod 82 is accommodated in the shoulder hole 75 of the push block 72 and the shoulder aperture 85 of the guide device 70, with a head 83 thereof being received in the larger hole 77 of the push block 72. A diameter of an intermediate portion (not labeled) of the body of the guide rod 82 is slightly less than a diameter of the smaller aperture 87 of the guide block 80. A screw hole (not shown) is defined in an end of the guide rod 82 opposite the head 83. The bolt 86 is engaged with the screw hole (not shown) of the guide rod 82, with a screw cap (not labeled) of the bolt 86 being received in the larger aperture 88 the guide block 80. The second spring 84 is accommodated in the larger aperture 88 of the guide block 80, and abuts against an inner surface of the screw cap of the bolt 86.

Figure 6:
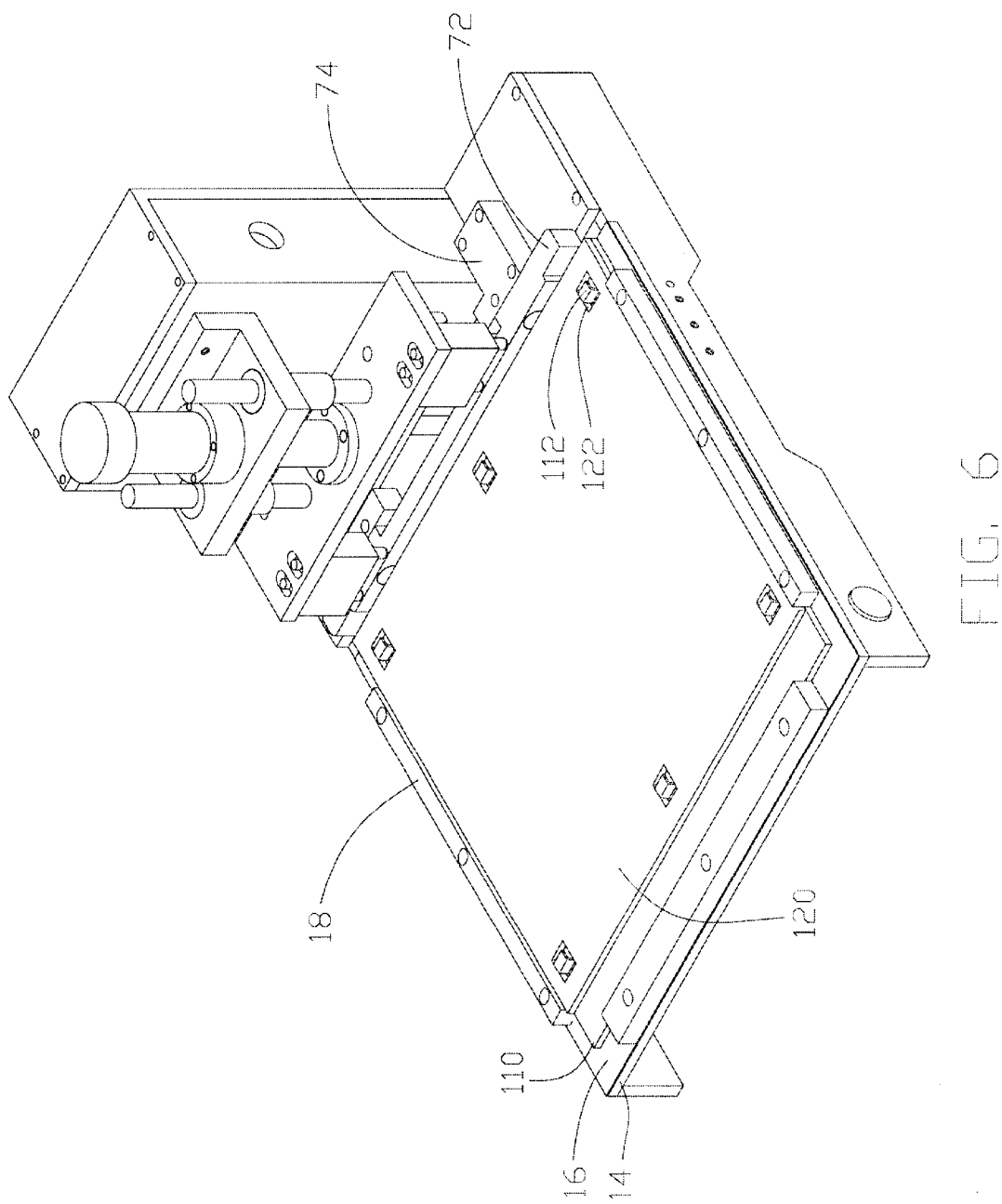
FIG. 6 is similar to FIG. 1, with workpieces placed on a workbench of the pressing machine.

Referring also to FIG. 6, in operation, a plastic member 110 is placed on the rubber gasket 16. A metal member 120 is then placed on the plastic member 110, with hooks 112 defined in the plastic member 110 extending through corresponding openings 122 defined in the metal member 120. The power supply buttons 28 are then turned on synchronously. The cylinder 32 moves the coupling bar 34 up and down periodically, thereby causing the connecting board 36, the wedge block 40 and the pair of pressing devices 42 to move up and down periodically. When the coupling bar 34 is about halfway down its path of travel, the pressing pins 52 abut against the metal member 120. The pressing pins 52 impact the metal member 120 and the plastic member 110, and the first springs 54 are compressed. The first slopes 48 of the wedge block 40 abut against the second slope 78, thereby causing the push block 72 to move horizontally toward the metal member 120 along the guide rods 82. The push block 72 accordingly pushes the metal member 120 to move horizontally toward the hooks 112 of the plastic member 110. The second springs 84 in the guide devices 74 are consequently compressed. When the wedge block 40 abuts the stop screw 26, the downward movement of the coupling bar 34 is blocked. The push block 72 consequently stops pushing the metal member 120. The metal member 120 is completely engaged with the hooks 112 of the plastic member 110 at the corresponding openings 122 of the metal member 120. The coupling bar 34 then starts moving up, and the wedge block 40 is accordingly moved up. When the first slope 48 of the wedge block 40 disengages from the second slope 76 of the push block 72, the second spring 84 elastically deforms back to its original shape, thereby causing the push block 72 to move back to its original position.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A pressing machine for joining workpieces comprising:
   a workbench having securing means adapted for fixing at least one of the workpieces on the workbench;
   a rigging adapted for providing vertical movement, the rigging comprising a wedge block having a first slope;
   at least one pressing device connected with the rigging and adapted for impacting the workpieces; and
   a push apparatus comprising a pushing block having a second slope, wherein
      when the wedge block is vertically moved to cause the first slope to contact the second slope the push apparatus is moved horizontally for horizontally pushing one of the workpieces to move relative to the others, thereby joining the workpieces.

2. The pressing machine as claimed in claim 1, wherein the rigging further comprises a cylinder, a connecting board, a coupling bar connected between the cylinder and the connecting board, and wherein the wedge block is secured under the connecting board.

3. The pressing machine as claimed in claim 2, wherein the pressing block is secured under the connecting board.

4. The pressing machine as claimed in claim 1, wherein the push apparatus comprises at least one guide device secured on the workbench.

5. The pressing machine as claimed in claim 1, wherein a stop screw is secured in the workbench with one half thereof extending through the second slope.

6. The pressing machine as claimed in claim 3, wherein a distal end of the guide rod received in the shoulder aperture of the guide block defines a screw hole for engaging with a bolt, and a resilient member is received in the shoulder aperture to abut against the bolt.

7. The pressing machine as claimed in claim 6, wherein the resilient member is a spring.

8. The pressing machine as claimed in claim 4, wherein the push block defines a shoulder hole, and wherein each guide device comprises a guide block defining a shoulder aperture in communication with the shoulder hole, and a guide rod extending through the shoulder hole and movably received in the shoulder aperture.

9. The pressing machine as claimed in claim 1, wherein each pressing device comprises a pressing block defining at least one piston hole and a corresponding through aperture in communication with each piston hole, at least one pressing pin extending through the at least one through aperture with a cap thereof received in the piston hole, and at least one elastic member received in the piston hole and abutting the cap of the pressing pin.

10. The pressing machine as claimed in claim 9, wherein the elastic member is a spring.

11. The pressing machine as claimed in claim 1, wherein the workbench comprises a pair of side walls, a base mounted over the side walls and a chassis, the rigging being attached on one side of the chassis.

12. The pressing machine as claimed in claim 11, wherein the securing means comprises at least one elongated stop block secured on the base opposite to the chassis.

13. A pressing machine for joining workpieces comprising:
   a workbench adapted for fixing a workpiece thereon;
   a rigging adapted for providing vertical movement;
   a pressing device connected to the rigging, the pressing device comprising a pressing block and a pressing pin movable relative to the pressing block adapted for impacting the workpieces;

a wedge block secured under the rigging; and a push apparatus comprising a pushing block movable relative to the workbench, wherein when the pressing device is moved downwardly the wedge block will horizontally move the push apparatus for horizontally pushing one of the workpieces to move relative to the others, thereby joining the workpieces.

14. The pressing machine as claimed in claim 13, wherein the push apparatus comprises at least one guide device secured on the workbench and a push block movable relative to the at least one guide device.

15. The pressing machine as claimed in claim 14, wherein the wedge block defines a first slope and the push block defines a second slope corresponding to the first slope.

16. The pressing machine as claimed in claim 14, wherein the push block defines a shoulder hole, and wherein each guide device comprises a guide block defining a shoulder aperture in communication with the shoulder hole, a guide rod extending through the shoulder hole to the shoulder aperture, a bolt engaging with a distal end of the guide rod, and a spring compressed between the guide rod and the bolt.

17. A pressing machine for joining workpieces comprising:

a workbench adapted for fixing the workpieces;

a rigging adapted for providing vertical movement; and a pressing device and a wedge block respectively connected to the rigging and discrete from each other, the pressing device comprising a pressing block and a pressing pin movable relative to and discrete from the pressing block and adapted for impacting the workpieces; wherein the rigging device actuates not only a downward movement of the wedge block for horizontal movement of at least one of the working pieces but also a downward movement of the pressing pin for rejoining the workpieces after said at least one of the working pieces has been horizontally moved.

* * * * *